United States Patent [19]
Noordeen et al.

[11] Patent Number: 5,974,534
[45] Date of Patent: Oct. 26, 1999

[54] PREDECODING AND STEERING MECHANISM FOR INSTRUCTIONS IN A SUPERSCALAR PROCESSOR

[75] Inventors: Nazeemudeen Noordeen; Jason Zheng, both of Santa Clara, Calif.

[73] Assignee: Hewlett-Packard Company, Palo Alto, Calif.

[21] Appl. No.: 08/194,899

[22] Filed: Feb. 14, 1994

[51] Int. Cl.$^6$ ........................................................ G06F 9/38

[52] U.S. Cl. ........................................... 712/215; 712/213

[58] Field of Search ..................................... 712/208, 214, 712/23, 209, 210, 212, 213, 215

[56] References Cited

U.S. PATENT DOCUMENTS

| | | | |
|---|---|---|---|
| 4,295,193 | 10/1981 | Pomerene ................................. | 712/215 |
| 5,101,341 | 3/1992 | Circello et al. .......................... | 712/213 |
| 5,129,067 | 7/1992 | Johnson .................................... | 712/213 |
| 5,214,763 | 5/1993 | Blaner et al. ............................. | 712/212 |
| 5,233,694 | 8/1993 | Hotta et al. .............................. | 712/215 |
| 5,233,696 | 8/1993 | Suzuki ..................................... | 712/204 |
| 5,335,331 | 8/1994 | Murao et al. ............................ | 712/213 |
| 5,337,415 | 8/1994 | DeLano et al. .......................... | 712/213 |

FOREIGN PATENT DOCUMENTS

| | | | |
|---|---|---|---|
| 0 449 661 A3 | 3/1991 | European Pat. Off. .......... | G06F 9/38 |
| 0 455 966 A2 | 3/1991 | European Pat. Off. .......... | G06F 9/38 |
| 0 459 232 A3 | 5/1991 | European Pat. Off. .......... | G06F 9/38 |

OTHER PUBLICATIONS

E. DeLano, W. Walker, J. Yetter, M. Forsyth, "A High Speed Superscalar PA–RISC Processor", IEEE, 1992, pp. 116–121.
IEEE Pacific Rim Conference on Communications, Computers & Signal Processing, vol. 1, May 9, 1991, pp. 21–24., Minagawa K., et al., "Pre–decoding Medhanism For Superscalar Architecture".
Computer Architecture News, vol. 20, No. 4, Sep. 1992, pp. 44–53, Vassiliadis, et al., On The Attributes Of The SCISM Organization.

*Primary Examiner*—Viet D. Vu

[57] ABSTRACT

A computing system includes a main memory, an instruction cache and a processor. The processor includes memory interface means, predecoding means, interface means, a first arithmetic logic unit, a second arithmetic logic unit and steering means. The memory interface means is connected to the main memory and fetches instructions from the main memory. The predecoding means is connected to the memory interface means and predecodes the instructions to generate predecode bits. The predecode bits indicate whether and how the instructions may be bundled. The interface means is connected to the predecoding means and the instruction cache. The interface means stores the instructions and the predecode bits in the instruction cache and fetches the instructions from the instruction cache with the predecode bits. The steering means is connected to the interface means, the first arithmetic logic unit and the second arithmetic logic unit. The steering means steers each of the instructions to one of the first integer arithmetic logic unit and the second integer arithmetic logic unit for execution. The steering means utilizing the predecode bits to steer the instructions.

9 Claims, 4 Drawing Sheets

FIGURE 1

FIGURE 4

PREDECODING AND STEERING MECHANISM FOR INSTRUCTIONS IN A SUPERSCALAR PROCESSOR

BACKGROUND

The present invention concerns predecoding and steering instructions executed in a superscalar processor.

Most modern computer systems include a central processing unit (CPU) and a main memory. The speed at which the CPU can decode and execute instructions and operands depends upon the rate at which the instructions and operands can be transferred from main memory to the CPU. In an attempt to reduce the time required for the CPU to obtain instructions and operands from main memory, many computer systems include a cache memory between the CPU and main memory.

A cache memory is a small, high-speed buffer memory which is used to hold temporarily those portions of the contents of main memory which it is believed will be used in the near future by the CPU. The main purpose of a cache memory is to shorten the time necessary to perform memory accesses, either for data or instruction fetch. The information located in cache memory may be accessed in much less time than information located in main memory. Thus, a CPU with a cache memory needs to spend far less time waiting for instructions and operands to be fetched and/or stored.

A cache memory is made up of many blocks of one or more words of data. Each block has associated with it an address tag that uniquely identifies which block of main memory it is a copy of. Each time the processor makes a memory reference, an address tag comparison is made to see if a copy of the requested data resides in the cache memory. If the desired memory block is not in the cache memory, the block is retrieved from the main memory, stored in the cache memory and supplied to the processor. A cache memory used to store instructions is generally referred to as an instruction cache. A program counter is used to determine which instructions are to be fetched for execution.

In some computer systems, parallel execution of instructions (called "bundling" of instructions) may be utilized to speed up computer operation. Processors which provide for parallel execution of instructions can be referred to as superscalar processors. Superscalar computers generally utilize more than one execution unit to provide for bundling of instructions. An execution unit is, for example an arithmetic logic unit (ALU) or a floating point unit (FPU).

Even with multiple execution units, there are still limitations to which instructions may be bundled. For example, some instruction may have conflicts with other instructions. The type of conflict can take various forms. A resource conflict occurs when two instructions both use the same, limited processor resource. This may occur, for example, when both instructions require use of the same execution unit. Alternately, data dependency may result in a conflict. That is, when one instruction produces a result to be used by a next instruction, the two instructions cannot be bundled. Also, a procedural dependency may result in a conflict. For example, an instruction which follows a branch instruction cannot be bundled with the branch instruction, since execution of the instruction depends on whether the branch is taken. In order to determine whether two or more given instructions can be bundled, it is generally necessary to first decode the instructions. This may be done, for example by an instruction decode unit.

Various methods have been advanced for minimizing the performance penalty for decoding and steering instructions to the proper execution unit. For example, compiler techniques may be used to assist the instruction decode unit to determine whether two or more instructions can be bundled. That is, during compile time, the compiler can encode one or more bits in the actual instruction operational code (op-code) to be utilized by the instruction decode/steering hardware. These bits can provide information to the decode hardware as to how the instruction may be bundled with other instructions. The predecode information, in effect, is employed as part of the instruction set architecture. However, the information needed by the decode hardware is processor dependent; therefore, such an encoding of bits can limit the flexibility of different processors to optimally execute op-code without a code recompile.

In one system, a dedicated predecoded bit is stored in the instruction cache which is used by decode hardware to steer instructions to either an integer arithmetic logic unit (ALU) or a floating point unit (FPU). See, for example, E. DeLano, W. Walker, J. Yetter, M. Forsyth, "A High Speed Superscalar PA-RISC Processor", IEEE, 1992, pp. 116–121.

SUMMARY OF THE INVENTION

In accordance with the preferred embodiment of the present invention, a computer system is presented. The computing system includes a main memory, an instruction cache and a processor. The processor includes memory interface means, predecoding means, interface means, a first arithmetic logic unit, a second arithmetic logic unit and steering means. The memory interface means is connected to the main memory and fetches instructions from the main memory. In the preferred embodiment, the memory interface means fetches the instructions from the main memory two at a time in a double word.

The predecoding means is connected to the memory interface means and predecodes the instructions to generate predecode bits. The predecode bits indicate whether and how the instructions may be bundled. In the preferred embodiment, the predecode bits identify, for each pair of bundled instructions, to which of the first integer arithmetic logic unit and the second integer arithmetic logic unit a particular instruction is to be steered. The predecoding means includes three predecode registers. A first predecode register holds an even word instruction of an instruction pair currently being decoded. A second predecode register holds an odd word instruction of the instruction pair currently being decoded. A third predecode register holds an odd word instruction of an instruction pair previously predecoded.

The interface means is connected to the predecoding means and the instruction cache. The interface means stores the instructions and the predecode bits in the instruction cache and fetches the instructions from the instruction cache with the predecode bits. The steering means is connected to the interface means, the first arithmetic logic unit and the second arithmetic logic unit. The steering means steers each of the instructions to one of the first integer arithmetic logic unit and the second integer arithmetic logic unit for execution. The steering means utilizes the predecode bits to steer the instructions. In the preferred embodiment, the steering means includes a state machine. A current state of the state machine determines which of the predecode bits the steering means utilizes to steer the instructions.

In the preferred embodiment of the present invention, the processor also includes a floating point unit connected to the steering means. The steering means steers floating point instructions to the floating point processor. Also in the preferred embodiment, the predecode bits generated by the predecoding means indicate whether two consecutive instructions may be bundled for execution. Additionally, the predecode bits generated by the predecoding means indicate whether two consecutive instructions which may be bundled for execution are non-aligned or aligned.

The preferred embodiment of the present invention implements efficient bundling and steering of instructions in a superscalar processor.

DESCRIPTION OF THE PREFERRED EMBODIMENT

Figure 1:
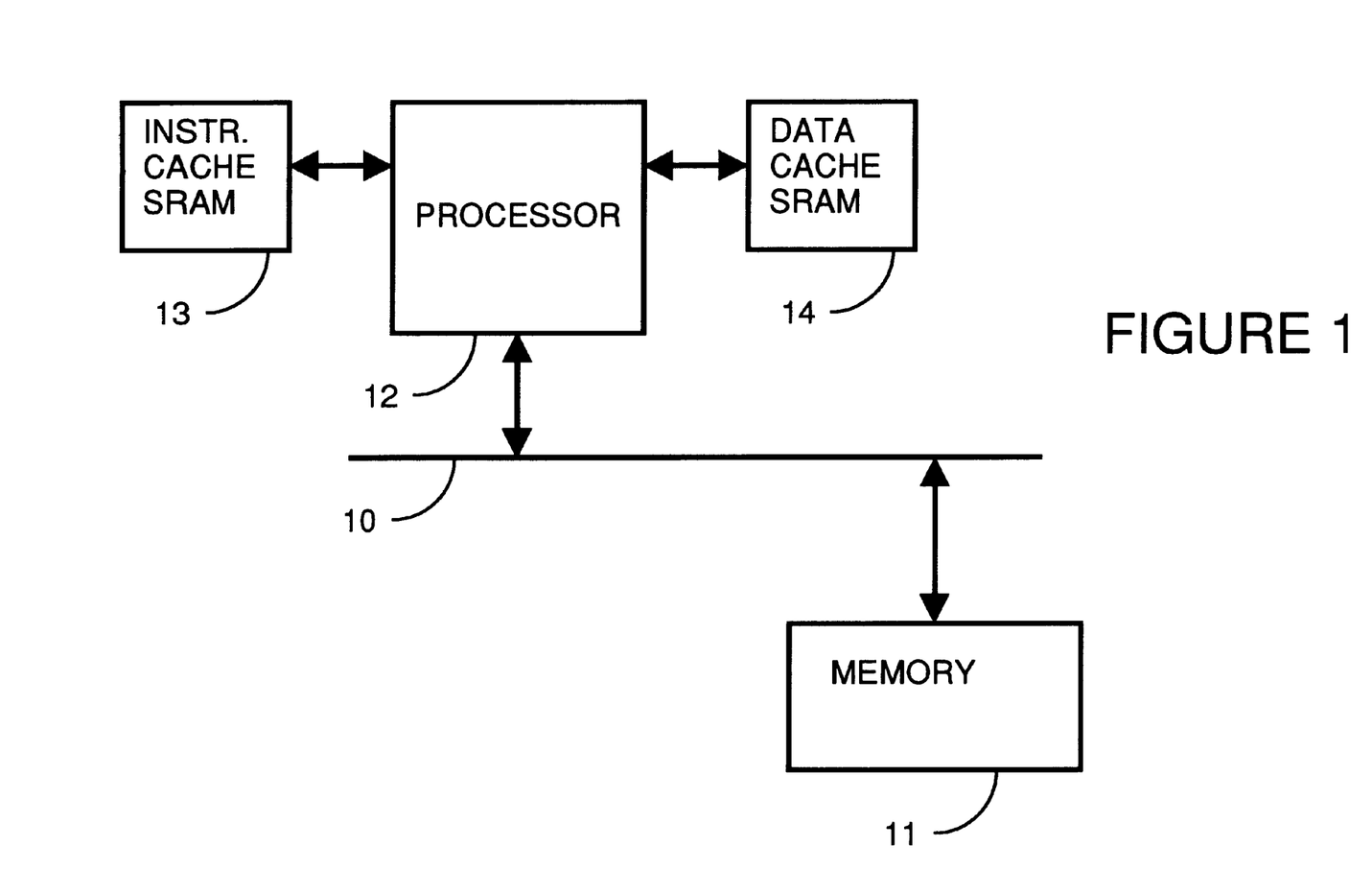
FIG. 1 shows a simplified block diagram of a computer system with a instruction cache and a data cache, in accordance with a preferred embodiment of the present invention.

FIG. 1 shows a simplified block diagram of a computer system. A processor 12 and a memory 11 are shown connected to a bus 10. Processor 12 utilizes a instruction cache 13 and a data cache 14. Instruction cache 13 stores instructions for processor 12 in static random access memory (SRAM). Data cache 14 stores data for processor 12 in SRAM.

Figure 2:
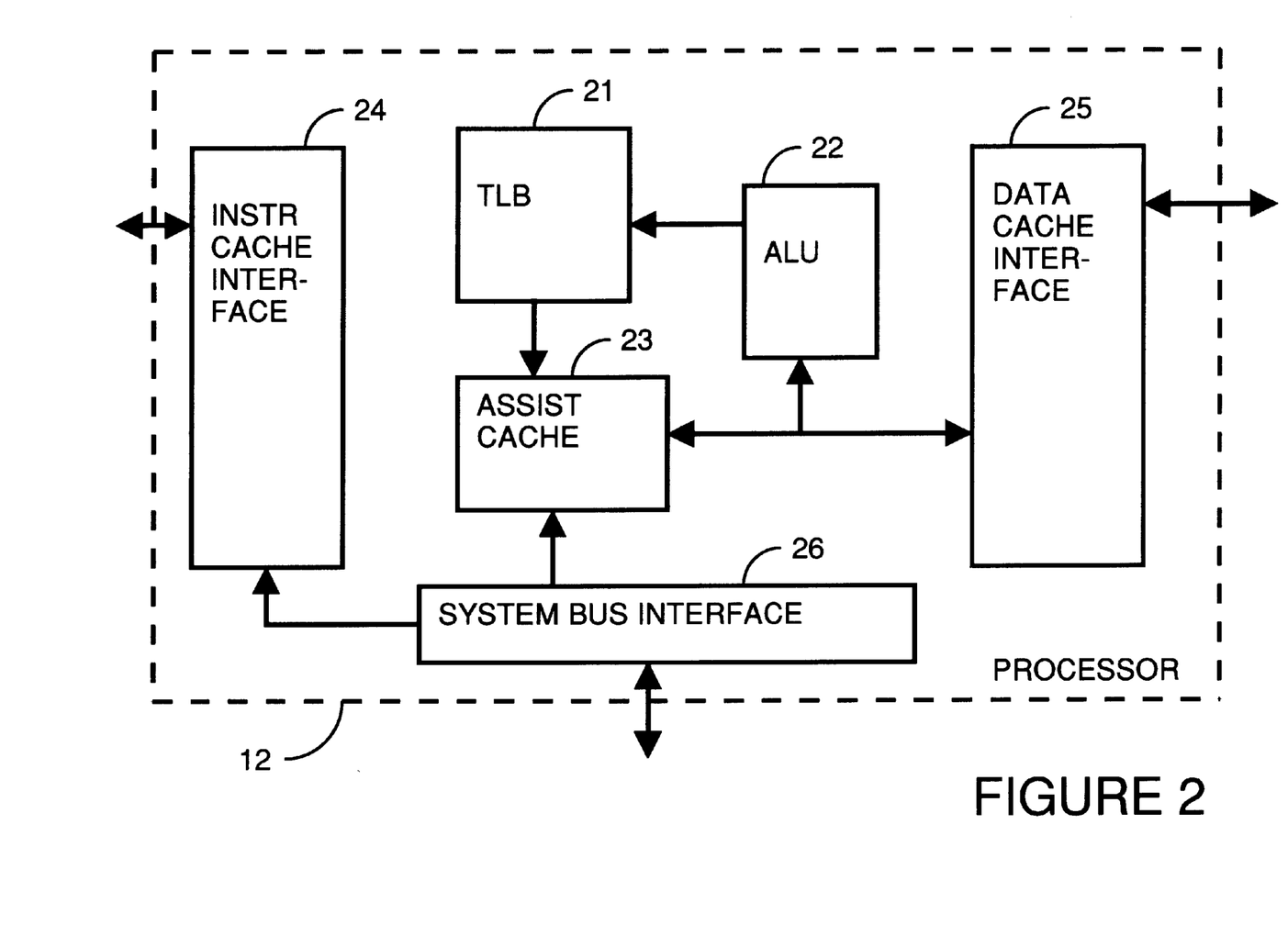
FIG. 2 shows a simplified block diagram of a processor shown in FIG. 1, in accordance with a preferred embodiment of the present invention.

FIG. 2 shows a simplified block diagram of processor 12. Processor 12 is shown to include system bus interface logic 26, instruction cache interface logic 24, data cache interface logic 25, an arithmetic logic unit (ALU) 22, a translation look aside buffer (TLB) 21, and an assist cache 23. System bus interface logic 26 provides processor 12 with an interface to system bus 10. Instruction cache interface logic 24 provides processor 12 with an interface to instruction cache 13. Data cache interface logic 25 provides processor 12 with an interface to data cache 14. Assist cache 23 is used in parallel with data cache 14 to provide data to arithmetic logic unit 22. Translation look aside buffer 21 is used to map virtual addresses to real addresses in order to generate cache tags to be used to access to data stored within assist cache 23 and within data cache 14.

Figure 3:
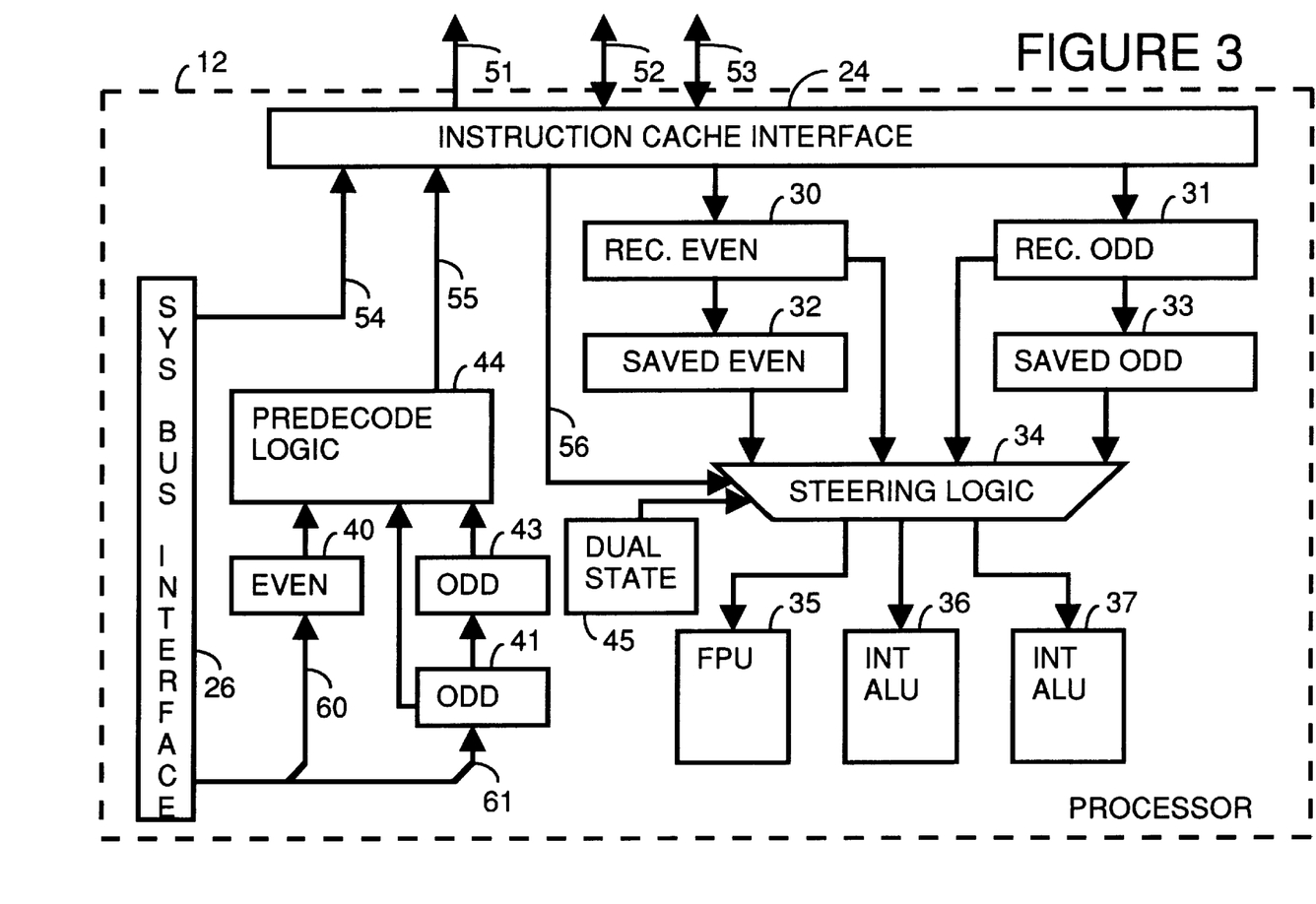
FIG. 3 shows a simplified block diagram of the logical blocks pertaining to predecoding and steering of instructions within the processor shown in FIG. 1, in accordance with a preferred embodiment of the present invention.

FIG. 3 is a simplified block diagram of the logical blocks pertaining to predecoding and steering instructions within processor 12. In the preferred embodiment of the present invention, system bus interface 26 implements 64-bit wide double-word transfers between memory 11 and processor 12. Each double-word contains two 32-bit instructions. The instruction in a double word which occupies the high order bits (bits [0:31]) of the double word is referred to as the even word instruction. The instruction in a double word which occupies the low order bits (bits [32:63]) of the double word is referred to as the odd word instruction.

When words are retrieved from memory 11 and forwarded to instruction cache along data path 54, predecode logic 44 generates predecode bits, placed on a data path 55, to be stored with each double word. The nature and function of the predecode bits are further described below.

Predecode logic 44 generates the predecode bits based on information in the double word. When a double word is fetched from memory, the even word instruction, through a data path 60, is placed in an even word instruction register 40. The odd word instruction, through a data path 61, is placed in an odd word instruction register 41. When a next double word is fetched from memory, the new even word instruction is placed in even word instruction register 40. The new odd word instruction is placed in odd word instruction register 41. The odd word instruction formerly in odd word instruction register 41 is moved to an odd word instruction register 43. As will be further described below, predecode logic 44, on the basis of the instructions in even word instruction register 40, odd word instruction register 41 and odd word instruction register 43 generates the predecode bits placed on data path 55.

Instruction cache interface 24 stores double words received on data path 54 together with predecode bits on data path 55 into instruction cache 13. Address lines 51 are used to address memory locations in instruction cache 13. A sixty-four bit wide data path 52 is used to transfer double-word instructions between processor 12 and instruction cache 13. Predecode bits stored with a double word are transferred simultaneously with the double word between instruction cache 13 and processor 12 along a data path 53. Instruction cache 13 stores the predecode bits along with the associated double word.

When a double word is retrieved by processor 12 from instruction cache 13 for execution of instructions within the double word, the even word instruction is placed in a received even word instruction register 30, and the odd word instruction is placed in a received odd word instruction register 31.

When a next double word is retrieved by processor 12 from instruction cache 13, the new even word instruction is placed in received even word instruction register 30, and the new odd word instruction is placed in received odd word instruction register 31. The even word instruction formerly in received even word instruction register 30 is moved to a saved even word instruction register 32. The odd word instruction formerly in received odd word instruction register 31 is moved to a saved odd word instruction register 33.

Steering logic 34 forwards instructions in received even word instruction register 30, saved even word instruction register 32, received odd word instruction register 31 and saved odd word instruction register 33 to either an arithmetic logic unit (ALU) 36, an ALU 37 or a floating point unit (FPU) 35 for execution. Steering logic 34 makes the decision based on predecoded bits received on data path 56 as well as state information received from a dual state machine 45. In the preferred embodiment, steering logic 34 also looks at a single bit from saved odd register 33 to see whether this is a floating point instruction or not.

In the preferred embodiment of the present invention there are six categories of instructions. The first category is load/store (ldst) instructions. Execution of ldst instructions results in information being loaded from or stored to memory/cache. This first category includes, for example, instructions which load or store integers as well as floating point numbers.

The second category is arithmetic/logic (alu) instructions. The second category includes, for example, instructions which perform an add, subtract, and logic "OR", and a logic "AND".

The third category is mask/merge/shift (mms) instructions. The third category includes, for example, instructions which deposit, extract, and shift data within one or more registers.

The fourth category is floating point (flop) instructions. The fourth category includes, for example, instructions which add, multiply, divide and perform square roots on floating point numbers.

The fifth category is branch (br) instructions. The fifth category includes, for example, instructions which compare and branch, add and branch, and branch and link.

The sixth category is system (sys) instructions. The sixth category includes, for example, instructions which insert TLB values, flush the data cache, move to/from control registers, move to/from space registers.

In the preferred embodiment of the present invention, FPU 35, ALU 36 and ALU 37 each execute only instructions in certain categories. Specifically, FPU 35 executes only instructions in the fourth category (flop instructions). ALU 36 executes instructions in the second category (alu instructions), in the third category (mms instructions) and in the fifth category (br instructions). ALU 37 executes instructions in the first category (ldst instructions) and in the second category (alu instructions). Instructions in the sixth category (sys instructions) require both ALU 36 and ALU 37 to execute them.

In the preferred embodiment of the present invention, for every double word of two instructions, predecode logic 44 generates six predecode bits. The predecode bits indicate alignment and bundling of instructions. When aligned instructions are bundled, this means that the instruction in the even word of the current double word is to be executed simultaneously with the instruction in the odd word of the current double word. When non-aligned instructions are bundled, this means that the instruction in the even word of the current double word is to be executed simultaneously with the instruction in the odd word of the previous double word.

The first (bit 0) predecode bit (EFLOP), when set, indicates that the even word instruction is a floating point operation for an aligned double word. The second (bit 1) predecode bit (AL02), when set, indicates that the double word aligned two instructions are bundled and the odd word instruction is steered to 37. The third (bit 2) predecode bit (AL01), when set, indicates that the double word aligned two instructions are bundled and the odd word instruction is steered to ALU 36. The fourth (bit 3) predecode bit (NLE2), when set, indicates that the double word non-aligned two instructions are bundled and the even word instruction is steered to ALU 37. The fifth (bit 4) predecode bit (NLE1), when set, indicates that the double word non-aligned two instructions are bundled and the even word instruction is steered to ALU 36. The sixth (bit 5) predecode bit (ALDUAL), when set, indicates that the double word aligned two instructions are bundled.

Encoding of the predecode bits is performed by predecode logic 44 as follows. When a double word is fetched from memory, the even word instruction is placed in even word instruction register 40. The odd word instruction is placed in odd word instruction register 41. Within a single instruction cycle, predecode logic 44 generates predecode bits which apply to the aligned double word consisting of the even word instruction placed in even word instruction register 40 and the odd word instruction placed in odd word instruction register 41. The generated predecode bits also apply to the non-aligned double word consisting of the odd word instruction placed in odd word instruction register 43 and the even word instruction placed in even word instruction register 40. The generated predecode bits are forwarded to instruction cache interface 24 to be stored in instruction cache 13 with the double word originally fetched from memory.

Predecode logic 44 sets EFLOP bit when the even word instruction placed in even word instruction register 40 is a floating point instruction.

Predecode logic 44 sets AL02 bit when the odd word instruction placed in odd word instruction register 41 is a load/store instruction or an alu operation instruction. However, for the bit to be set, there can be no dependencies between the even word instruction placed in even word instruction register 40 and the odd word instruction placed in odd word instruction register 41. There are three dependencies which prevent the setting of AL02 bit. The first dependency is a register set/use dependency which occurs, for example, when the even word instruction in even word register 40 sets a particular register and if the odd word instruction in odd word register 41 uses the register. The second dependency is a carry/barrow set/use dependency which occurs, for example, when the even word instruction in even word register 40 sets a carry/barrow bit and the odd word instruction in odd word register 41 uses the carry/barrow bit. The third dependency is a branch/system dependency which occurs, for example, when the even word instruction in even word register 40 is a branch or a system instruction. An instruction following a branch cannot be bundled with the branch instruction. Nothing can be bundled with a system instruction.

Predecode logic 44 sets AL01 bit when the odd word instruction placed in odd word instruction register 41 is a mms instruction, a branch instruction or an alu operation instruction. However, for the bit to be set, there can be no dependencies between the even word instruction placed in even word instruction register 40 and the odd word instruction placed in odd word instruction register 41.

Predecode logic 44 sets NLE2 bit when the even word instruction placed in even word instruction register 40 is a load/store instruction or an alu operation instruction. However, for the bit to be set, there can be no dependencies between the odd word instruction placed in odd word instruction register 43 and the even word instruction placed in even word instruction register 40.

Predecode logic 44 sets NLE1 bit when the even word instruction placed in even word instruction register 40 is a mms instruction, a branch instruction or an alu operation instruction. However, for the bit to be set, there can be no dependencies between the odd word instruction placed in odd word instruction register 43 and the even word instruction placed in even word instruction register 40.

Predecode logic 44 sets ALDUAL bit when the even word instruction placed in even word instruction register 40 may be bundled with the odd word instruction placed in odd word instruction register 41. However, for the bit to be set, there can be no dependencies between the even word instruction placed in even word instruction register 40 and the odd word instruction placed in odd word instruction register 41. The ALDUAL bit is not used for steering.

Figure 4:
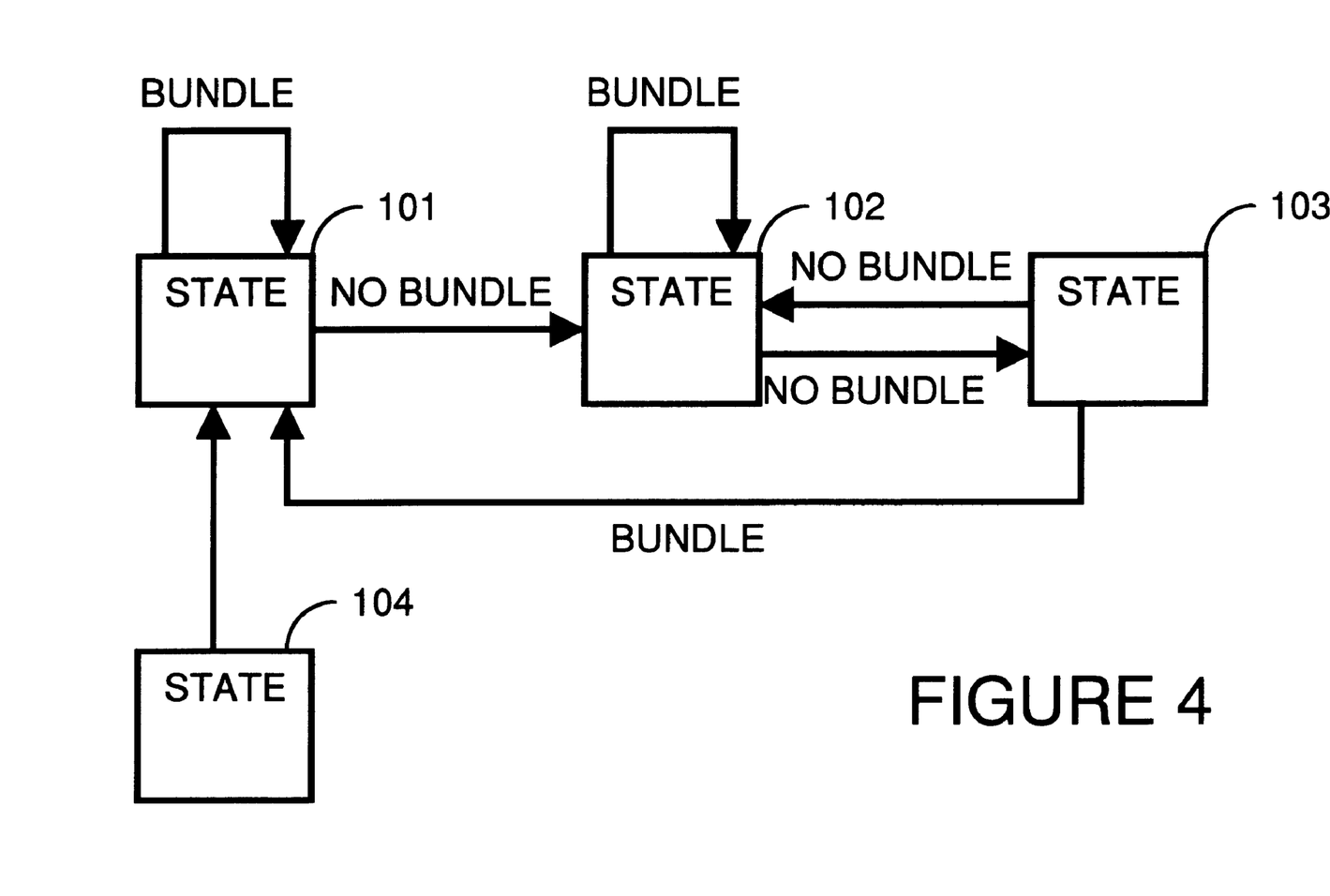
FIG. 4 is a state diagram for a state machine shown in FIG. 3 in accordance with the preferred embodiment of the present invention.

FIG. 4 shows a state diagram for dual state machine 45. Whenever there is a branch to an even word instruction, dual state machine 45 enters a state 101. As long as instructions from double words retrieved from instruction cache 13 are bundled, dual state machine stays in state 101. When two instructions in a double word are not bundled, dual state machine 43 enters a state 102. As long as non-aligned instructions retrieved from instruction cache 13 are bundled, dual state machine stays in state 102. When non-aligned instructions are not bundled, dual state machine 43 enters a state 103. If the next aligned instructions from double words retrieved from saved even word instruction register 32 and saved odd word instruction register 33 are bundled, dual state machine enters state 101. When, in state 103, next aligned instructions from saved even word instruction register 32 and saved odd word instruction register 33 are not bundled, dual state machine 43 enters state 102.

Whenever there is a branch to an odd word instruction, dual state machine 45 enters a state 104. In state 104, instructions may not be bundled. After execution of the odd word instruction, dual state machine 45 enters state 101.

Steering logic 34 steers instructions in received even word instruction register 30, saved even word instruction register 32, received odd word instruction register 31 and saved odd word instruction register 33 to either ALU 36, ALU 37 or FPU 35 based on predecoded bits received on data path 56 as well as state information received from a dual state machine 45. In the preferred embodiment, steering logic 34 also looks at a single bit from saved odd register 33 to see whether this is a floating point instruction or not.

Steering Table 1 shows which instructions are executed by which of ALU 36, ALU 37 or FPU 35 when dual state machine 45 is in state 101 or state 103 and the aligned instructions are bundled.

indicates predecode bit EFLOP is cleared. A "1" in the third column indicates predecode bit EFLOP is set. The fourth column of Steering Table 1 shows the value of predecoded bit AL01 for the double word stored in even word instruction register 30 and odd word instruction register 31. The fifth column of Steering Table 1 shows the value of predecoded bit AL02 for the double word stored in even word instruction register 30 and odd word instruction register 31. The sixth column of Steering Table 1 shows the value of predecoded bit NLE1 for the double word stored in even word instruction register 30 and odd word instruction register 31. The "X" values in the sixth column indicates that it does not matter whether bit NLE1 bit is cleared or set. The seventh column of Steering Table 1 shows the value of predecoded bit NLE2 for the double word stored in even word instruction register 30 and odd word instruction register 31. The eighth column of Steering Table 1 shows the instruction from column 1 or column 2 that is to be steered to ALU 36. An "X" value in the eighth column indicates that it does not matter which instruction is steered to ALU 36. The ninth column of Steering Table 1 shows the instruction from column 1 or column 2 that is to be steered to ALU 37. An "X" value in the eighth column indicates that it does not

STEERING TABLE 1

| Instr. Register | | Predecoded Bits | | | | Execution Unit | | |
|---|---|---|---|---|---|---|---|---|
| Even 30 | Odd 31 | EFLOP | AL01 | AL02 | NLE1 | NLE2 | ALU 36 | ALU 37 | FPU 35 |
| e_alu | o_alu | 0 | 1 | 0 | X | X | o_alu | e_alu | X |
| e_alu | o_mms | 0 | 1 | 0 | X | X | o_mms | e_alu | X |
| e_alu | o_br | 0 | 1 | 0 | X | X | o_br | e_alu | X |
| e_alu | o_ldst | 0 | 0 | 1 | X | X | e_alu | o_ldst | X |
| e_alu | o_flop | 0 | 0 | 0 | X | X | e_alu | X | o_flop |
| e_ldst | o_alu | 0 | 1 | 0 | X | X | o_alu | e_ldst | X |
| e_ldst | o_mms | 0 | 1 | 0 | X | X | o_mms | e_ldst | X |
| e_ldst | o_br | 0 | 1 | 0 | X | X | o_br | e_ldst | X |
| e_ldst | o_flop | 0 | 0 | 0 | X | X | X | e_ldst | o_flop |
| e_flop | o_alu | 1 | 1 | 0 | X | X | o_alu | X | e_flop |
| e_flop | o_mms | 1 | 1 | 0 | X | X | o_mms | X | e_flop |
| e_flop | o_br | 1 | 1 | 0 | X | X | o_br | X | e_flop |
| e_flop | o_ldst | 1 | 0 | 1 | X | X | X | o_ldst | e_flop |
| e_mms | o_alu | 0 | 0 | 1 | X | X | e_mms | o_alu | X |
| e_mms | o_ldst | 0 | 0 | 1 | X | X | e_mms | o_ldst | X |
| e_mms | o_flop | 0 | 0 | 0 | X | X | e_mms | X | o_flop |

The first column of Steering Table 1 above shows the type of instruction that is in even word instruction register 30. The "e" listed before the type of instruction indicates that it is the even instruction in a double word. The second column of Steering Table 1 above shows the type of instruction that is in odd word instruction register 31. The "o" listed before the type of instruction indicates that it is the odd instruction in a double word. The third column of Steering Table 1 shows the value of predecoded bit EFLOP for the double word stored in even word instruction register 30 and odd word instruction register 31. A "0" in the third column matter which instruction is steered to ALU 37. The tenth column of Steering Table 1 shows the instruction from column 1 or column 2 that is to be steered to FPU 35. An "X" value in the eighth column indicates that it does not matter which instruction is steered to FPU 35.

Steering Table 2 shows which instructions are executed by which of ALU 36, ALU 37 or FPU 35 when dual state machine 45 is in state 102 and the non-aligned instructions are bundled.

STEERING TABLE 2

| Instr. Register | | Predecoded Bits | | | | Execution Unit | | |
|---|---|---|---|---|---|---|---|---|
| Odd 33 | Even 30 | EFLOP | AL01 | AL02 | NLE1 | NLE2 | ALU 36 | ALU 37 | FPU 35 |
| e_alu | e_alu | 0 | X | X | 1 | 0 | e_alu | o_alu | X |
| o_alu | e_mms | 0 | X | X | 1 | 0 | e_mms | o_alu | X |
| o_alu | e_br | 0 | X | X | 1 | 0 | e_br | o_alu | X |
| o_alu | e_flop | 1 | X | X | 0 | 0 | o_alu | X | e_flop |
| o_alu | e_ldst | 0 | X | X | 0 | 1 | o_alu | e_ldst | X |
| o_ldst | e_alu | 0 | X | X | 1 | 0 | e_alu | o_ldst | X |

STEERING TABLE 2-continued

| Instr. Register | | Predecoded Bits | | | | | Execution Unit | | |
|---|---|---|---|---|---|---|---|---|---|
| Odd 33 | Even 30 | EFLOP | AL01 | AL02 | NLE1 | NLE2 | ALU 36 | ALU 37 | FPU 35 |
| o_ldst | e_mms | 0 | X | X | 1 | 0 | e_mms | o_ldst | X |
| o_ldst | e_br | 0 | X | X | 1 | 0 | e_br | o_ldst | X |
| o_ldst | e_flop | 1 | X | X | 0 | 0 | X | o_ldst | e_flop |
| o_flop | e_alu | 0 | X | X | 1 | 0 | e_alu | X | o_flop |
| o_flop | e_mms | 0 | X | X | 1 | 0 | e_mms | X | o_flop |
| o_flop | e_br | 0 | X | X | 1 | 0 | e_br | X | o_flop |
| o_flop | e_ldst | 0 | X | X | 0 | 1 | X | e_ldst | o_flop |
| o_mms | e_alu | 0 | X | X | 0 | 1 | o_mms | e_alu | X |
| o_mms | e_ldst | 0 | X | X | 0 | 1 | o_mms | e_ldst | X |
| o_mms | e_flop | 1 | X | X | 0 | 0 | o_mms | X | e_flop |

The first column of Steering Table 2 above shows the type of instruction that is in even word instruction register 33. The "o" listed before the type of instruction indicates that it is the odd instruction in a double word. The second column of Steering Table 2 above shows the type of instruction that is in even word instruction register 30. The "e" listed before the type of instruction indicates that it is the odd instruction in a double word. The third column of Steering Table 2 shows the value of predecoded bit EFLOP for the double word stored in even word instruction register 30 and odd word instruction register 33. The fourth column of Steering Table 2 shows the value of predecoded bit AL01 for the double word stored in even word instruction register 30 and odd word instruction register 33. The fifth column of Steering Table 2 shows the value of predecoded bit AL02 for the double word stored in even word instruction register 30 and odd word instruction register 33. The sixth column of Steering Table 2 shows the value of predecoded bit NLE1 for the double word stored in even word instruction register 30 and odd word instruction register 33. The seventh column of Steering Table 2 shows the value of predecoded bit NLE2 for the double word stored in even word instruction register 30 and odd word instruction register 33. The eighth column of Steering Table 2 shows the instruction from column 1 or column 2 that is to be steered to ALU 36. The ninth column of Steering Table 2 shows the instruction from column 1 or column 2 that is to be steered to ALU 37. The tenth column of Steering Table 2 shows the instruction from column 1 or column 2 that is to be steered to FPU 35.

Table 3 below illustrates predecoding bits for seven double words generated by predecode logic 44 as the seven double words are fetched from memory 11 and placed in instruction cache 13.

TABLE 3

| Even Word | Odd Word | Predecoded Bits | | | | | |
|---|---|---|---|---|---|---|---|
| | | EFLOP | AL02 | AL01 | NLE2 | NLE1 | ALDUAL |
| alu | ldst | 0 | 1 | 0 | 0 | 0 | 1 |
| br | alu | 0 | 0 | 0 | 0 | 1 | 0 |
| flop | mms | 1 | 0 | 1 | 0 | 0 | 1 |
| ldst | sys | 0 | 0 | 0 | 1 | 0 | 0 |
| e_mms | o_mms | 0 | 0 | 0 | 0 | 0 | 0 |
| flop | br | 1 | 0 | 1 | 0 | 0 | 1 |
| sys | flop | 0 | 0 | 0 | 0 | 0 | 0 |

For the first double word, predecode bit AL02 is set indicating that the double word aligned two instructions can be bundled and the odd word instruction is steered to 37. Also, predecode bit ALDUAL is set indicating that the double word aligned two instructions are bundled.

For the second double word, predecode bit NLE1 is set indicating that the double word non-aligned two instructions can be bundled and the even word instruction is steered to ALU 36.

For the third double word, predecode bit EFLOP is set indicating that the even word instruction is a floating point operation for an aligned double word. Also, predecode bit AL01 is set, indicating that the double word aligned two instructions can be bundled and the odd word instruction is steered to ALU 36. Also, predecode bit ALDUAL is set indicating that the double word aligned two instructions are bundled.

For the fourth double word, predecode bit NLE2 is set indicating that the double word non-aligned two instructions can be bundled and the even word instruction is steered to ALU 37.

For the fifth double word, no predecode bits are set indicating no bundling is possible.

For the sixth double word, predecode bit EFLOP is set indicating that the even word instruction is a floating point operation for an aligned double word. Also, predecode bit AL01 is set, indicating that the double word aligned two instructions can be bundled and the odd word instruction is steered to ALU 36. Also, predecode bit ALDUAL is set indicating that the double word aligned two instructions are bundled.

For the seventh double word, no predecode bits are set indicating no bundling is possible.

Table 4 below shows steering for the above seven words during the first eight execution cycles.

TABLE 4

| Cycle | Dual State | Even 30 | Odd 31 | Even 32 | Odd 33 | ALU 36 | ALU 37 | EPU 35 |
|---|---|---|---|---|---|---|---|---|
| 1 | 1 | alu | ldst | X | X | alu | ldst | X |
| 2 | 1 | br | alu | alu | ldst | br | X | X |
| 3 | 2 | flop | mms | br | alu | X | alu | flop |
| 4 | 2 | ldst | sys | flop | mms | mms | ldst | X |
| 5 | 2 | e_mms | o_mms | ldst | sys | sys | sys | X |
| 6 | 3 | flop | br | e_mms | o_mms | e_mms | X | X |
| 7 | 2 | flop | br | e_mms | o_mms | o_mms | X | flop |
| 8 | 3 | sys | flop | flop | br | br | X | X |

The first column of Table 4 shows the cycle. The second column of Table 4 indicates the current state of dual state machine 45. A value of "1" indicates dual state machine 45 is in state 101. A value of "2" indicates dual state machine 45 is in state 102. A value of "3" indicates dual state machine 45 is in state 103. A value of "4" indicates dual state machine 45 is in state 104. The third column indicates the instruction placed in even word instruction register 30. The fourth column indicates the instruction placed in odd word instruction register 31. The fifth column indicates the instruction placed in even word instruction register 32. The sixth column indicates the instruction placed in odd word instruction register 33. The seventh column shows the instruction from column 3, column 4, column 5 or column 6 that is to be steered to ALU 36. An "X" value in the seventh column indicates that it does not matter which instruction is steered to ALU 36. The eighth column shows the instruction from column 3, column 4, column 5 or column 6 that is to be steered to ALU 37. The ninth column shows the instruction from column 3, column 4, column 5 or column 6 that is to be steered to FPU 35.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A computer system comprising:

a main memory;

an instruction cache; and a processor coupled to the main memory and the instruction cache, the processor including:

memory interface means, coupled to the main memory, for fetching instructions from the main memory, predecoding means, coupled to the memory interface means, for predecoding three instructions to generate a first set of predecode bits, the predecode bits including bundling information which indicates whether a first instruction is to be bundled with a preceding second instruction for execution and which indicates whether the first instruction is to be bundled with a following third instruction for execution, the predecode bits additionally including steering information which is in addition to the bundling information, interface means, coupled to the predecoding means and the instruction cache, for storing the instructions and the predecode bits in the instruction cache and for fetching the instructions from the instruction cache with the predecode bits, wherein the first instruction and the following third instruction are stored as a double word in the instruction cache and the first set of predecode bits is stored with the double word in the instruction cache, a first arithmetic logic unit which is able to execute a first plurality of instruction types, a second arithmetic logic unit which is able to execute a second plurality of instruction types, wherein there is an overlap within the first and second pluralities of instruction types so that there exist instructions that are executable both by the first arithmetic logic unit and the second arithmetic logic unit, and steering means, coupled to the interface means, the first arithmetic logic unit and the second arithmetic logic unit, for steering each of the instructions to one of the first integer arithmetic logic unit and the second integer arithmetic logic unit for execution, the steering means utilizing the steering information included in the predecode bits to steer the instructions.

2. A computer system as in claim 1 wherein the predecode bits generated by the predecoding means indicate whether two consecutive instructions which are to be bundled for execution are non-aligned or aligned.

3. A computer system as in claim 2 wherein the memory interface means fetches the instructions from the main memory two at a time in a double word.

4. A computer system as in claim 1 wherein:

the first instruction is an even instruction of an instruction pair currently being decoded;

the following third instruction is an odd instruction of the instruction pair currently being decoded; and, the preceding second instruction is an odd word instruction of an instruction pair previously predecoded.

5. A computer system as in claim 1 wherein the predecoding means includes:

a first predecode register for holding the first instruction;

a second predecode register for holding following third instruction; and, a third predecode register for holding the preceding second instruction.

6. A computer system as in claim 1 wherein the steering means includes a state machine, a current state of the state machine determining which of the predecode bits the steering means utilizes to steer the instructions.

7. A computer system as in claim 1 wherein the processor additionally includes a floating point unit coupled to the steering means, the steering means steering floating point instructions to the floating point processor.

8. A computer system as in claim 7 wherein the predecode bits generated by the predecoding means are as follows:

a first predecode bit, which when asserted, indicates that the first instruction is a floating point instruction;

a second predecode bit, which when asserted, indicates that the first instruction and the following third instruction are bundled together for execution, and the following third instruction is to be steered to the second integer arithmetic logic unit for execution;

a third predecode bit, which when asserted, indicates that the first instruction and the following third instruction are bundled together for execution, and the following third instruction is to be steered to the first integer arithmetic logic unit for execution;

a fourth predecode bit, which when asserted, indicates that the preceding second instruction and the first instruction are bundled together for execution, and the first instruction is to be steered to the second integer arithmetic logic unit for execution;

a fifth predecode bit, which when asserted, indicates that the preceding second instruction and the first instruction are bundled together for execution, and the first instruction is to be steered to the first integer arithmetic logic unit for execution; and, a sixth predecode bit, which when asserted, indicates that the first instruction and the following third instruction are bundled together for execution.

9. A computing system as in claim 7 wherein:

the steering means steers load/store instructions only to the second integer arithmetic logic unit;

the steering means steers arithmetic/logic instructions to one of the first integer arithmetic logic unit and the second integer arithmetic logic unit;

the steering means steers mask/merge/shift only to the first integer arithmetic logic unit;

the steering means steers floating point instructions only to the floating point unit;

the steering means steers branch instructions only to the first integer arithmetic logic unit; and, the steering means steers system instructions to both the first integer arithmetic logic unit and the second integer arithmetic logic unit.

\* \* \* \* \*

UNITED STATES PATENT AND TRADEMARK OFFICE
CERTIFICATE OF CORRECTION

PATENT NO.    : 5,974,534
DATED         : October 26, 1999
INVENTOR(S)   : Noordeen et al.

It is certified that error appears in the above-identified patent and that said Letters Patent is hereby corrected as shown below:

Column 4,
Line 31, after "31." do not begin a new paragraph.

Column 12,
Line 49, delete "claim 1" and insert therefor -- claim 4 --

Signed and Sealed this

Twenty-fourth Day of December, 2002

JAMES E. ROGAN
*Director of the United States Patent and Trademark Office*